United States Patent
Efthymiou et al.

(10) Patent No.: US 9,383,224 B2
(45) Date of Patent: Jul. 5, 2016

(54) DATA TRANSMISSION APPARATUS AND METHOD

(75) Inventors: Costas Efthymiou, Bristol (GB); Georgios Kalogridis, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 959 days.

(21) Appl. No.: 13/093,170

(22) Filed: Apr. 25, 2011

(65) Prior Publication Data
US 2011/0267202 A1 Nov. 3, 2011

(30) Foreign Application Priority Data
Apr. 29, 2010 (GB) .................................. 1007181.9

(51) Int. Cl.
G08C 15/06 (2006.01)
G01D 4/00 (2006.01)
H04L 29/06 (2006.01)
H04W 8/26 (2009.01)

(52) U.S. Cl.
CPC ............ G01D 4/004 (2013.01); H04L 63/0407 (2013.01); H04L 63/102 (2013.01); H04L 63/0823 (2013.01); H04W 8/26 (2013.01); Y02B 70/3266 (2013.01); Y02B 90/242 (2013.01); Y02B 90/246 (2013.01); Y04S 20/242 (2013.01); Y04S 20/322 (2013.01); Y04S 20/42 (2013.01); Y04S 40/24 (2013.01)

(58) Field of Classification Search
None
See application file for complete search history.

(56) References Cited

U.S. PATENT DOCUMENTS 7,402,993 B2 7/2008 Morrison
2004/0140908 A1 7/2004 Gladwin et al.
2006/0161400 A1 7/2006 Kagan
2009/0088907 A1 4/2009 Lewis et al.
2009/0146838 A1 6/2009 Katz
2009/0198384 A1 8/2009 Ahn
(Continued)

FOREIGN PATENT DOCUMENTS

GB 2 479 922 A 11/2011
JP 2005-513900 A 5/2005
(Continued)

OTHER PUBLICATIONS

Search Report issued Sep. 6, 2010 in United Kingdom Patent Application No. GB1007181.9.
Search Report issued Mar. 24, 2011 in United Kingdom Patent Application No. GB1100755.6.
Search Report issued Oct. 1, 2012 in United Kingdom Patent Application No. GB1100755.6.
(Continued)

*Primary Examiner* — John A Tweel, Jr.
*Assistant Examiner* — Shawna M Kingston
(74) *Attorney, Agent, or Firm* — Oblon, McClelland, Maier & Neustadt, L.L.P.

(57) ABSTRACT

A system comprising a data collector and a plurality of end consumers connected to and supplied with a utility by a utility distribution station. Each end consumer comprises a metering device arranged to meter the end consumer's consumption of the utility supplied by the distribution station. The metering device is arranged to report consumption data to the data collector using a high frequency ID, the high frequency ID being anonymous so that the consumption data reported by the metering device together with the high frequency ID is not able to be associated to a particular metering device and to report the consumption data to the data collector using a low frequency ID so that the consumption data reported by the metering device together with the low frequency ID is able to be attributed to a particular metering device. The data collector stores IDs and is arranged to only accept consumption data carrying a said stored ID.

9 Claims, 5 Drawing Sheets

(56) References Cited

U.S. PATENT DOCUMENTS

2010/0082792 A1 4/2010 Johnson
2011/0303311 A1* 12/2011 Klicpera .................. 137/551

FOREIGN PATENT DOCUMENTS

| JP | 2006-340154 A | 12/2006 |
| JP | 2009-003954 A | 1/2009 |
| WO | WO 2009/033848 A2 | 3/2009 |

OTHER PUBLICATIONS

Office Action issued Sep. 11, 2012 in Japanese Patent Application No. 2011-100485 (with English language translation).
Elias L. Quinn, "Privacy and the New Energy Infrastructure", Center for Energy and Environmental Security (CEES), No. 09-001, 2008-2009, 43 Pages.
Richard Stallman, "Is digital inclusion a good thing? How can we make sure it is?" IEEE Communications Magazine, vol. 48, Feb. 2010, pp. 112-118.

* cited by examiner

DATA TRANSMISSION APPARATUS AND METHOD

This application is based upon and claims the benefit of priority from United Kingdom patent application No. 1007181.9, filed on 29 Apr. 2010; the entire contents of which are incorporated herein by reference.

FIELD

Embodiments described herein relate generally to protecting the privacy of an end consumer in a smart grid. Embodiments described herein moreover relate generally to the providing of anonymised energy consumption information required for control of the smart grid.

BACKGROUND

Historically, the electrical grid of each country has been a 'broadcast' grid, where a few central power generators (i.e. power stations) provide all the electricity production in a country or region and then distribute this electricity to the end users via a large network of cables and transformers. This model has worked well but there is a growing need to reform electrical grids, for a variety of reasons. As a result, national governments and relevant stakeholders are making significant efforts in the development of future electrical grids or 'Smart Grids'. Development of such new grids will require significant efforts in technology development, standards, policy and regulatory activities because of the inherent complexity of such a system. Smart metering is a key component of the future vision of smart grids.

A smart meter is an advanced meter (usually an electrical meter, but could also be integrated or work together with gas, water and heat meters) that measures energy consumption in much more detail than a conventional meter. Future smart meters may also communicate that information back to the local utility for monitoring and billing purposes. A smart meter may also potentially communicate with a number of appliances and devices within future 'smart-homes'.

Smart meters are expected to provide accurate readings automatically and at requested time intervals to the utility company, electricity distribution network or to the wider smart grid that is expected to replace the existing power distribution infrastructure. The expected frequency of such readings could be as high as every few (1-5) minutes, which raises important privacy issues regarding the availability and processing of such data (see, for example, a related story published by the Washington post, available at: http://voices.washingtonpost.com/securityfix/2009/11/experts_smart_grid_poses_priva.html). Such detailed energy usage information can lay bare the daily energy usage patterns of a household and even reveal what kind of device or appliance was in use at any given time. An example of this is given in FIG. 1, which is taken from E. L. Quinn, "Privacy and the New Energy Infrastructure", February 2009 (available at http://papers.ssrn.com/sol3/papers.cfm?abstract_id=1370731). Quinn further discusses these privacy concerns. Another useful discussion is provided in R. Stallman, "Is digital inclusion a good thing? How can we make sure it is?," IEEE Communications Magazine, vol. 48, pp. 112-118, February 2010.

BRIEF DESCRIPTION OF THE DRAWINGS

Embodiments will be described in the following by way of example only and with reference to the accompanying drawings, in which.

DETAILED DESCRIPTION OF EMBODIMENTS

Figure 1:
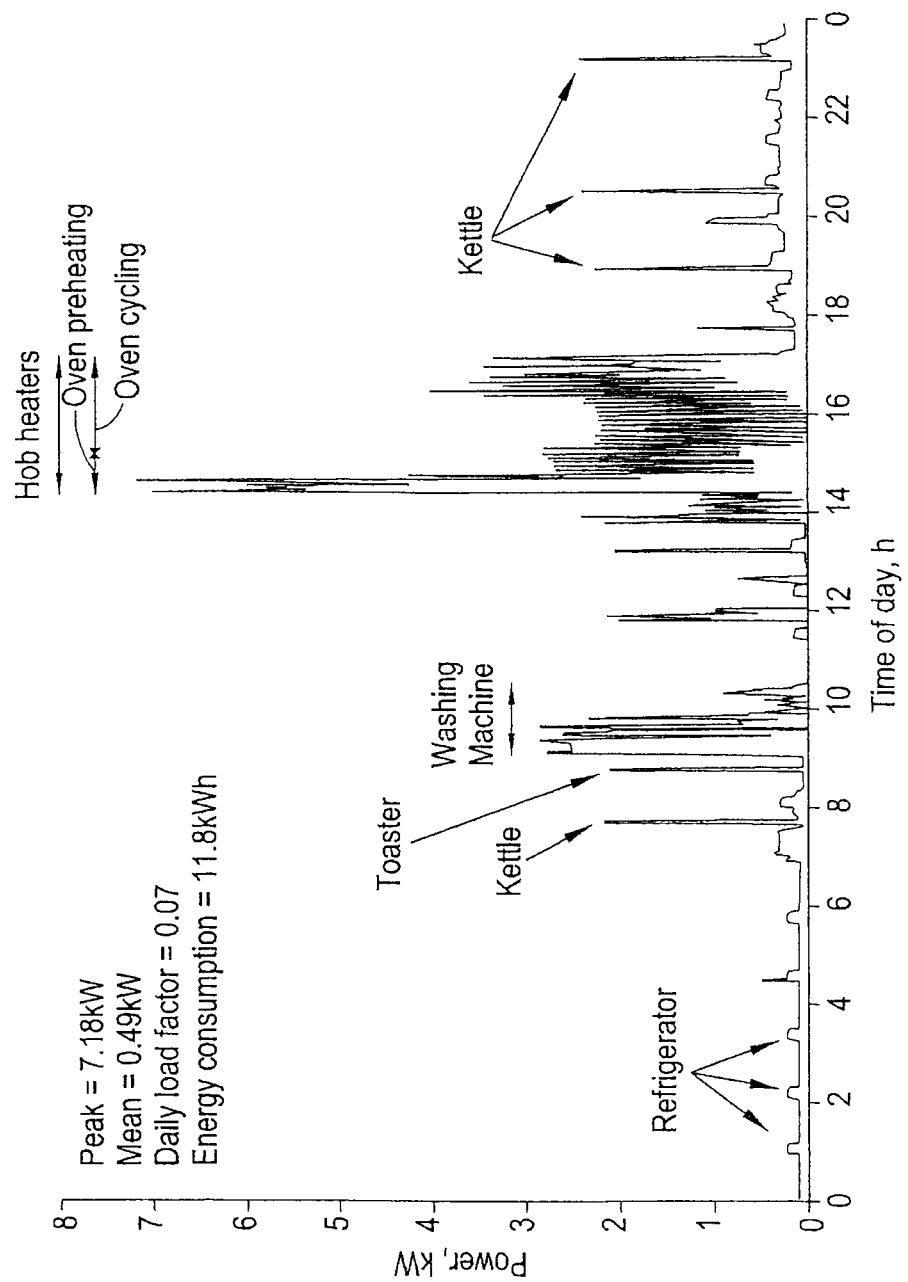
FIG. 1 shows an example of a known household load signature that has been recorded using a one minute time base.

According to an embodiment there is provided a system comprising a data collector and a plurality of end consumers connected to and supplied with a utility by a utility distribution station. Each end consumer comprises a metering device arranged to meter the end consumer's consumption of the utility supplied by the distribution station. The metering device is arranged to report consumption data to the data collector using a high frequency ID, the high frequency ID being anonymous so that the consumption data reported by the metering device together with the high frequency ID is not able to be associated to a particular metering device and to report the consumption data to the data collector using a low frequency ID so that the consumption data reported by the metering device together with the low frequency ID is able to be attributed to a particular metering device. The data collector stores IDs and is arranged to only accept consumption data carrying a said stored ID.

According to an embodiment there is provided a system comprising a data collector and a plurality of end consumers connected to and supplied with a utility by a utility distribution station. Each end consumer comprises a metering device arranged to meter the end consumer's consumption of the utility supplied by the distribution station. The metering device is arranged to report consumption data to the data collector using an anonymous unique ID. The data collector stores IDs and is arranged to only accept consumption data carrying a said stored ID.

The end consumer can be a building or house, be provided or located within a building or house, be part of a building or house, be provided/located within a part of a building or house, be a household or form part of a household or be any other power consumer unit that may be individually monitored using a smart meter.

The utility can be electric power, gas, water or any other utility for which consumption is monitored. The data collector may be part of the utility distribution station.

According to another embodiment there is provided a system comprising a data collector and a plurality of end consumers connected to and supplied with a utility by a utility distribution station. Each end consumer comprises a metering device arranged to meter the end consumer's consumption of the utility supplied by the distribution station. The metering device is arranged to report consumption data to the data collector using a unique ID. The data collector stores unique IDs of metering devices and is arranged to only accept consumption data that carries an ID corresponding to one of the stored IDs. The data collector does not comprise information suitable for identifying at least two of the stored IDs to the associated metering devices.

The data collector can further be arranged to store the unique IDs upon request of a third party. The third party can be a trusted party that is entitled to request the storage of further IDs in the data collector and may be a party that is trusted to protect the privacy of the user or owner of a metering device more rigorously than the utility provider or entities under the control or influence of the utility provider. The data collector may store information for identifying messages received from the third party. The data collector may, for example, store an ID of the third party as well as the third party's public key. Any message received from the third party that has been digitally signed by the third party using the third party's private key can therefore be validated by the data collector, therefore ensuring that the source of the message is the third party.

The system may further comprise a utility provider and a utility distribution network, neither of which stores information suitable for associating at least two of the IDs of metering devices stored by the data collector with any metering device, so that the metering devices are not only anonymous with respect to the data collector but also with respect to the entire system under control of the utility provider.

According to another embodiment here is provided a method of reporting consumption data relating to the consumption, by a plurality of end users, of a utility provided by a utility distribution station to the end users. Each end user comprises a metering device having an anonymous unique ID. The method comprises transmitting consumption data together with the anonymous unique ID from the metering device to a data collector and checking, within the data collector, if the data collector has stored an ID corresponding to the received anonymous unique ID. If the data collector has stored an ID corresponding to the received anonymous unique ID, the data collector provides the consumption data to the distribution station.

The data collector may receive a request to store a further unique ID from a third party, check if the data collector stores information indicating that the third party is entitled to request the storage of a further unique ID and, if the third party is entitled to request the storage of further unique IDs, store the further unique ID.

Each of the metering devices comprising an anonymous ID can further comprise a second unique ID. This second unique ID may not be anonymous, so that the utility provider or any part of the system under its control can freely attribute data received together with the second unique ID with a physical device. In this manner data can be sent in an attributable manner, for example for billing purposes, while at other occasions anonymous data can be sent by the metering device to support grid control. It will be appreciate that the sending of anonymised data (using the first ID) will likely be required on a frequent basis, as defined by the grid operator or by the utility provider. It is envisaged that consumption data may be required to be received every few minutes for the purpose of grid control. Data necessary for other purposes, e.g. billing, in contrast will likely not be required as frequently, so that the data that is to be sent together with the second ID is sent less frequently than the data sent with the first ID.

In accordance with a further embodiment there is provided a metering device arranged to meter the consumption of a utility and to report metered consumption to a third party via a communication channel. The metering device comprises two unique IDs and is arranged to transmit consumption data via the communication channel using the first ID more regularly than to transmit consumption data using the second ID. The frequent transmission of data using the first ID may be made in an automatic fashion. The less regular transmission of data using the second ID may either be made automatically or on receipt of a request for such data. The metering device may be a smart electricity meter or a home gateway.

According to another embodiment there is provided a method of metering performed in a device for metering the consumption of a utility. The method comprises acquiring metering data and transmitting the metering data via a communication channel using a first ID more regularly than transmitting the metering data using a second ID.

According to another embodiment there is provided a device storing one or more IDs that are attributed to a physical metering device and a plurality of IDs that are not attributed to any physical metering devices. The device further comprises an input for receiving a message comprising data and a sender ID. The device is arranged to compare a received sender ID with the stored IDs and to provide the received data to a first communication channel if the received sender ID corresponds to a stored ID that is attributed to a physical metering device and to a second communication channel if the received sender ID corresponds to a stored ID that is not attributed to a physical metering device. The first communication channel may be a communication channel that can be established to, in practice, communicate with a utility distribution station that is connected to a number of end consumers, thereby supporting grid control using anonymous consumption data in the manner discussed above. The second communication channel may be a communication channel that can be established to, in use, communicate with a utility provider or an entity established by the utility provider to deal with administrative processes, such as billing. These communication channels may of course be logical channels that are operated via the same physical channel.

The device may further store information identifying a trusted third party. The device can be arranged to check whether a received request to store a further ID is from a trusted party as identified by the stored information and store the further ID if it is determined that the request to store this ID has been received from a trusted party.

According to another embodiment there is therefore provided a method of configuring an anonymous metering facility in a system comprising a metering device, a data collector and a trusted third party. The method comprises the sending of a request for configuration of the anonymous metering facility by the metering device. The request includes an anonymous unique ID of the metering device. The third party checks, upon receipt of the request, if a metering device with the ID of the request is entitled to send anonymous metering data and, if the metering device with the ID of the request is entitled to send anonymous metering data, sends a message comprising a permission for the ID to be used in anonymous metering. Upon receipt of the message the data collector checks if the third party is entitled to provide a permission for metering devices to use the anonymous metering facility. If the third party is entitled to provide the permission the data collector stores the ID.

According to another embodiment there is provided a method of initiating the configuring of anonymous metering in a system comprising the metering device. The method is performed in the metering device and comprises participating in data transmission within the system using an ID of the metering device and, after the expiry of a waiting period of random length, sending a request comprising a further ID of the metering device, wherein the request is a request for a permission for the metering device to participate in the anonymous metering using the further ID of the metering device.

The sending of the request for the metering device reveals the further ID of the metering device. It may be possible for the utility provider to associate the further ID of the metering device with the originally sent ID of the metering device, even if the request is sent to a trusted third party, if the sending of the request follows preceding data transmissions in a manner that allows correlating the sending of the request with the previous data transmission. The random waiting period introduced by the metering device reduces the likelihood that any analysis of such correlation will be successful.

According to another embodiment there is provided a metering device arranged to participate in a data transmission using an ID of the metering device and to send a request for a permission for the metering device to participate in anonymous metering using a further ID after the expiry of a waiting period of random length. The request comprises the further ID.

According to another embodiment there is provided a method of anonymously reporting the consumption of a utility. The method is performed in a metering device and comprises receiving a message to commence sending consumption data using an anonymous ID and, after the expiry of a waiting period of random length, starting to report consumption.

According to another embodiment there is provided a metering device arranged to start sending consumption data using an anonymous ID following receipt of a message to commence sending consumption data using the anonymous ID. Following expiry of a subsequent waiting period of random length the sending of consumption data is commenced.

Figure 2:
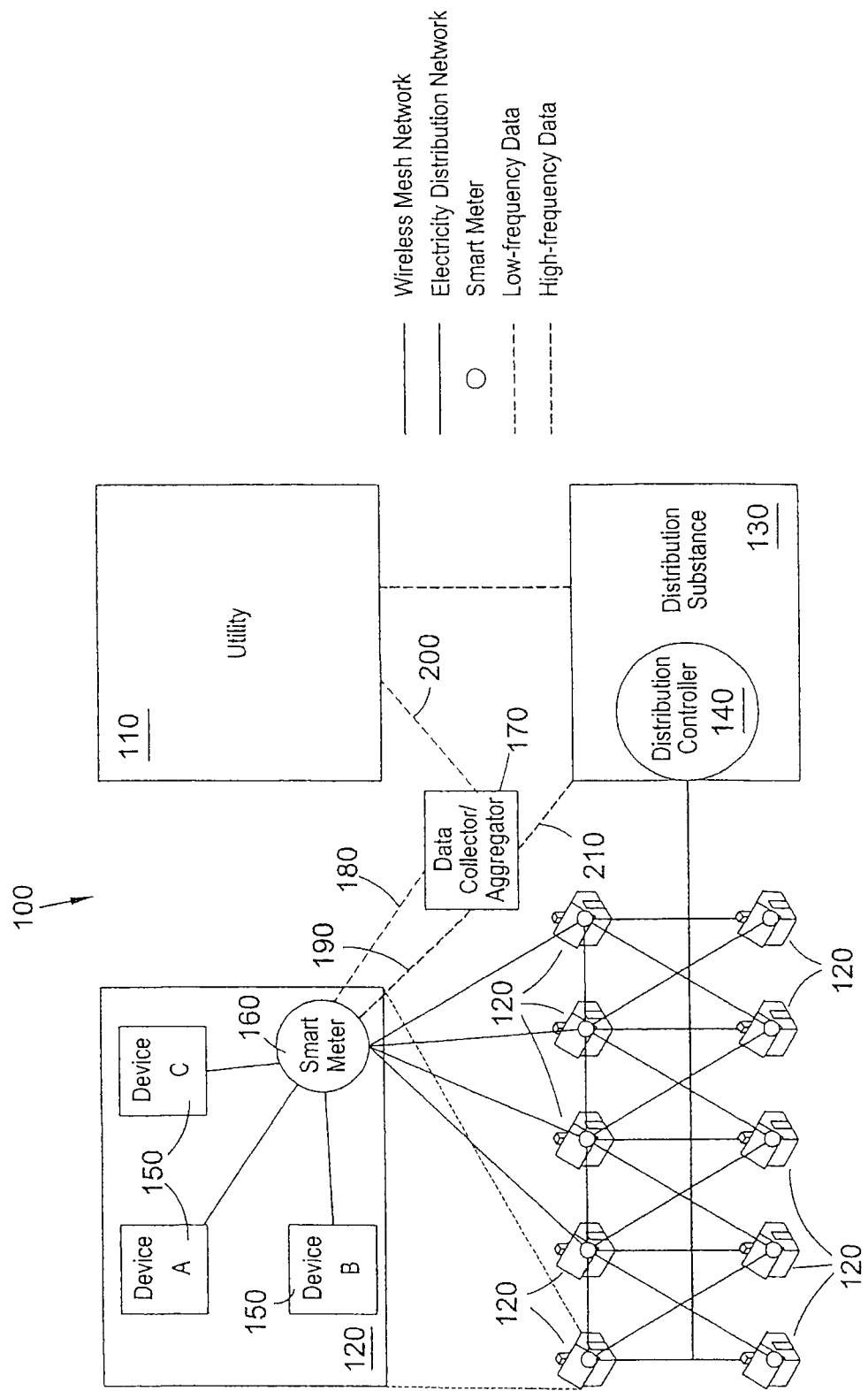
FIG. 2 shows an electricity distribution network and an associated smart metering data structure.
Figure 3:
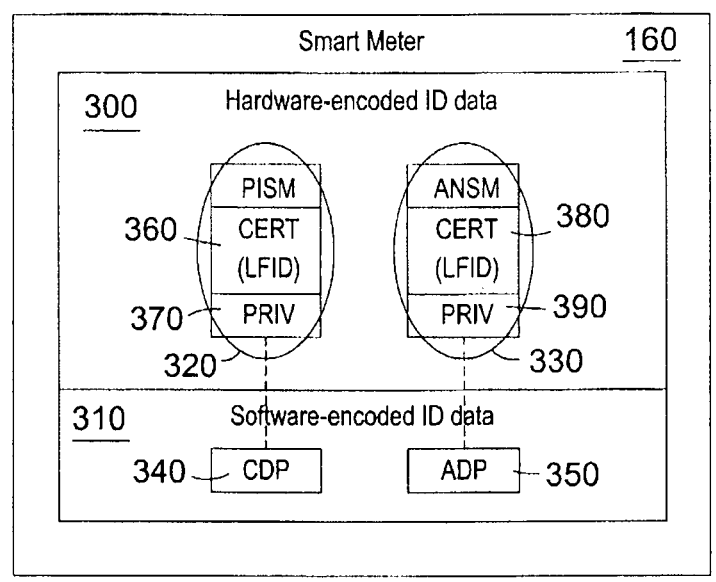
FIG. 3 shows the ID structure within a smart meter.

FIG. 2 shows part of an electricity grid 100 comprising a utility/electricity provider 110 that distributes electricity to a number of end consumers 120 via a distribution substation 130. The distribution substation comprises a distribution controller 140. The end consumers can be any type of house or building or part of a house or building for which the consumption of the utility is independently metered and may be a private home or property or a business property. The end consumer 120 comprises a number of electricity consuming devices 150 that tend to consume electricity independently. The end consumer 120 also comprises a smart meter 160. The function of standard smart meters is discussed above, alongside the discussion of the dangers to the privacy of the inhabitants or user of a house or end consumer 120. The smart meter 160 shown in FIG. 2 is not a standard smart meter and is instead adapted to transmit consumption data at two different frequencies, as discussed above. The architecture of the smart meter 160 is discussed in more detail below with reference to FIG. 3.

The smart meter 160 is connected to a data collector 170 via two logical data transmission channels 180 and 190. One way of establishing these channels is to use a single wireless link between the smart meter 160 and the data collector 170. The data collector 170 is local to the smart meters 160 for grid management purposes and sends aggregated metering data to the utility provider 110, to the network operators or to other relevant parties. As discussed above, such data is aggregated and associated with the ID that has formed part of the message sending the data. One logical data transmission channel 180 is established and used for the transmission of the low frequency consumption data, while the other logical channel 190 is established and used for the transmission of the anonymous high frequency consumption data. The data collector 170 is connected to the utility provider 110 through a data channel 200, through which the low frequency data is forwarded to the utility provider for invoicing, account management or any other purposes for which attributable data is required. The data collector is moreover connected to the distribution substation through a further data channel 210. The data channel 210 is used for forwarding the anonymous high frequency data received from the smart meter 160 to the distribution substation 130, so that the distribution substation 130 and the distribution controller 140 can use the high frequency data as basis for grid load management or any other operations that require such high-frequency metering data.

As can be seen from FIG. 2, individual smart meters 160 can be connected to adjacent smart meters 160 via a wireless link, thereby creating a wireless mesh network. This wireless mesh network connects smart meters 160 that are too remote from the data collector 170 for connecting to the data collector 170 directly to the data collector 170 in an indirect fashion via smart meters 160 located closer to the data collector 170. The smart meters 160 forward messages carrying consumption data received from other smart meters 160 to the data collector 170 and commands from the data collector to remote smart meters 160.

To enable the establishing of the low and high frequency data channels 180/200 and 190/210 respectively the smart meter 160 comprises two different IDs, one for each channel. Pertinent parts of the architecture of a smart meter 160 of one embodiment is shown in more detail in FIG. 3. As can be seen, the smart meter 160 comprises hardware encoded ID data 300 as well as software encoded ID data 310. The hardware encoded ID data 300 comprises a personally identifiable smart meter profile PISM 320 that is associated with a client data profile 340 in the software encoded ID data 310. The hardware encoded ID data 300 moreover comprises an anonymous smart meter profile ANSM 330 that is associated with an anonymous data profile 350 in the software encoded ID data 310.

PISM 320 comprises a certificate PISM.CERT 360 and a private key 370. The PISM certificate 360 comprises a low frequency ID LFID, the PISM public key and information on which certifying authority issued the PISM certificate. ANSM 330 comprises a certificate ANSM.CERT 380 and a private key 390. The ANSM certificate 380 comprises a high frequency ID HFID, the ANSM public key and information on what certifying authority issued the ANSM certificate. The only way for the high frequency ID HFID to be consistently anonymous is for it to never be known to the utility provider 110 or to an installer of the smart meter. This can be achieved by 'hiding' the HFID inside the smart meter 160, for example by hard coding it for use for all HFID-related metering messages sent by the smart meter 160. Both IDs, LFID and HFID are unique to the smart meter 160, in the same way that MAC addresses for IEEE 802.x devices are unique. Only one of the two IDs, the low frequency ID LFID, is visible to the utility provider 110, both during procurement and deployment of the smart meter 160. The only parties that are aware of the high frequency ID and of its link to the low frequency ID are the manufacturer of the smart meter 160 and any parties trusted by the manufacturer and operating as an escrow service.

As suggested by the certificate names and as also discussed above, PISM 320 and the client data profile 340 are for use in delivering data at a low frequency (via communication channels 180 and 200) and in a manner that allows the utility provider 110 to identify the smart meter 160, using the smart meter's low frequency ID LFID. ANSM 330 and the anonymous data profile 350 are for use in delivering data at a high frequency (via communication channels 190 and 210). These high frequency data transmissions use the high frequency ID, which cannot be associated with the smart meter 160 by the data collector 170 and by the utility provider 110. The high frequency data transmissions are thus such that the utility provider 110 is prevented from identifying the smart meter 160 from which the high frequency data transmissions originate. In the following, one way of configuring communication channels between the smart meter 160, the distribution substation 130 and the utility provider 110 via the data collector 170 is discussed.

The utility distribution substation is responsible for distributing the utility to end consumers connected to it. In a smart grid the distribution station can take active steps to change the distribution of the utility to the end consumers, for example by undertaking demand side response and demand side management functions. Such steps rely on the availability of consumption information relating to the end consumers connected to the distribution station. The need for such consumption information gives rise to the above discussed privacy threats. Embodiments alleviate these threats by providing for the anonymous reporting of the required consumption data. It is noted in this respect all messages that anonymously report consumption data can be collated to form a data set (such as the home load signature shown in FIG. 1, for example), as all of the messages carry the anonymous ID. However, the messages (and therefore the data set) cannot be attributed to a particular physical source/metering device because of the anonymity of the ID. This enables the data collector, or another device in the system, such as the utility distribution station, to identify the anonymous ID of the end consumer, that, judged by a load signature generated from the received consumption data associated with the anonymous ID, would be a suitable target for a grid management operation without, however, knowing the actual identity of the end consumer that is to participate in the grid management operation. Any such grid management operation can be implemented by broadcasting a command effecting implementation of the operation or requesting participation in the operation together with the anonymous ID to all metering devices that can possibly be associated with the anonymous ID. The metering device that is associated with the anonymous ID then receives the command or request and can implement it, while other metering devices that receive the message can simply ignore the command/request.

The consumption data can accurately reflect consumption by the end consumer. Alternatively the consumption data may be data that has been, while being based on accurate consumption data, modified for additional privacy protection. A method of modifying consumption data to increase privacy protection is described in a co-pending UK patent application entitled "Device and Method for anonymising smart metering data" with inventors G. Kalogridis, C. Efthymiou and M. Sooriyabandara.

The following section entitled CDP setup process provides an example of setting up data paths for the reporting of consumption data for billing purposes or any other purposes that require attributable consumption data. In a subsequent section entitled ADP setup process an example of setting up data paths for the anonymous reporting of consumption data for grid control or any other purposes that can benefit from the receipt of high-frequency data is discussed. Both these processes are described with reference to FIGS. 2 and 4.

CDP Setup Process

If an end consumer 120 is to be connected to the electricity grid 100, the owner of the end consumer 120 can apply to the utility provider 110 for such connection. Such an application 400 will comprise all of the information necessary for the utility provider 110 to identify the client.

The utility provider 110 then, in step 410, sends a message to data collector 170 that is associated with the end consumer 120 that comprises the smart meter 160 of the client. This message 410 comprises client information for identifying the client and the Personally Identifiable SM Profile Certificate (PISM.CERT). The PISM.CERT in turn contains the LFID discussed above. If the data collector 170 is the correct data collector 170 for collecting data from the smart meter 160 in question, then the data collector 170 returns its own certificate AGG.CERT to the utility provider 110 in step 420 to verify that the correct data collector has been contacted for the smart meter 160 in question. In step 430 the AGG.CERT and PISM.CERT are sent on to the power distribution network (PDNet) to enable the power distribution network to select the appropriate distribution substation 130. In this way each smart meter 160 is associated with the power distribution substation 130 that supplies power to the end consumers 120 metered by the smart meter. Such association is required in arrangements where the power distribution substation is responsible for implementing grid control measures. Such measures can only be implemented if the power distribution substation is aware which of the home load signatures received at the data collector 170 is from one of the end consumers 120 it supplies with power. It will be appreciated that the power distribution sub-station 170 nevertheless provides power to a number of end consumers 120. If more than one of the smart meters 160 of these end consumers 120 sends consumption data in an anonymised fashion (as discussed in more detail below), then neither the data collector 170, nor the power distribution substation 130 are able to unambiguously attribute received consumption data to a particular end consumer 120/smart meter 160. The power distribution network responds with its own certificate (PDN.CERT) in step 440 for verification.

Some or all of the above messages and certificates can be signed with respective private keys to reassure integrity. For example, the smart meter 160 can sign PISM with the PISM private key 330. The integrity of PISM can then be verified with the use of PISM.CERT 360. The utility can sign the (concatenated) message {U.CERT||CLI||PISM.CERT||PISM.Signature} (wherein CLI is the client information) with the utility provider's private key, so that the integrity of the concatenated message can be verified with the use of the utility provider's certificate U.CERT.

Once the utility provider 110 has received all of the information necessary for successfully registering the smart meter 160 in question, the utility provider 110 responds to the smart meter 160 in step 450 by providing a newly set up Client Data Profile (CDP), consisting of the client information CLI, PISM.CERT, AGG.CERT, U.CERT, PDN.CERT and code (U.code). The smart meter 160 is arranged to require the client (or an installer of the smart meter 160) to enter a code at the smart meter. The required code can have been communicated to the client or installer before commencement of the installation, for example by post. The code input by the client needs to match U.code to verify that the installation is being conducted by an authorised person and is consequently genuine. If the entered code matches U.code, the smart meter 160 sends the client data profile back to the utility provider 110 in step 460. It will be appreciated that all of the above messages can again be signed by the respective senders' private keys to ensure data integrity.

When the smart meter 160 performs its low frequency (and non-anonymous) data reporting function, the client data profile is attached, to the reporting data set to enable the utility provider 110 to identify the smart meter 160.

ADP Setup Process

After the setup process of the client data profile has been completed, the client data profile itself is sent to the third party escrow service provider in step 470, signed with the utility provider's private key (U.PRIV) for verification. The third party escrow service then instructs the smart meter 160 via the utility provider 110 to setup its anonymous data profile in steps 480 and 490.

The setup process for the anonymous data profile begins with a random time delay in step 500, so that the utility provider 110 cannot easily correlate the client data profile and the anonymous data profile. For this random delay to be effective, the mean interval time for this delay should be large when compared to the mean time between successive smart meter setups by the utility as well as when compared to the mean time between successive smart meter setups by the data collector. The delay period is determined by the smart meter 160 using a random process. The smart meter 160 could, for example, determine that the anonymous data profile set up process should be delayed by a number of days or weeks. This random time interval can be considered an obfuscation technique to add to the level of security provided by the use of the frequent but anonymous and infrequent but attributable reporting described herein. It will be appreciated that even during this delay period the smart meter can already fulfil basic metering functions. The smart meter can, for example, commence the non-anonymised and less frequent reporting of consumption data, so that the end consumer can start consuming the utility/electricity as soon as the client data profile has been set up. During this time the frequent reporting function may be disabled, so that the grid operators do not receive smart metering data suitable for grid control, as far as the smart meter 160 being set up is concerned.

After the random time interval 500 has elapsed, the smart meter 160 creates its anonymous data profile in step 510. The anonymous data profiled is comprised of an Anonymous Smart Meter Profile Certificate (ANSM.CERT), AGG.CERT, U.CERT and PDN.CERT, which were obtained during the CDP setup process. The anonymous data profile and client data protocol are then securely sent to the escrow service in step 520. For this purpose the anonymous data profile and client data protocol are signed with the private key of the anonymous smart meter profile (ANSM.PRIV) and encrypted with the escrow service's public key (ESC.PUB). The signature is used for data integrity, whereas the encryption with ESC.PUB makes the message confidential as only ESC can decrypt the message (with its respective private key).

After performing its own security checks in step 530, to validate the received combination of anonymous data profile and client data protocol with the escrow service's own expectation of a LFID/HFID pair, the escrow service sends a copy of the anonymous data profile together with escrow service's certificate ESC.CERT to the aggregator in step 540, signed with its private key (ESC.PRIV) for verification. The escrow service can be the manufacturer of the smart meter itself or a party trusted by the manufacturer of the smart meter 160 or by the customer that the smart meter 160 is being attached to. The LFID/HFID pair of the smart meter 160 will in either case be known to the escrow service, which can consequently perform the required check. At this point, the data collector 170 knows that a securely verified and authorised smart meter 160 will at some point start sending high-frequency metering data to it, which it will then forward on to the utility provider 110, distribution network or other entity as appropriate.

After the escrow service has notified the smart meter 160 in step 550 that the anonymous data profile has been notified to the data collector 170, the smart meter 160 introduces another random time interval 560. This random time delay is analogous to the time delay 500 used by the smart meter 160 prior to creating its anonymous data profile, so that the data collector 170 cannot easily correlate the anonymous data profile with a specific smart meter 160. After this second random interval 560 has elapsed, the smart meter 160 can commence sending high-frequency metering data, as indicated by step 570. Each of these high-frequency metering messages 570 from the smart meter will include this anonymous data profile.

Figure 4:
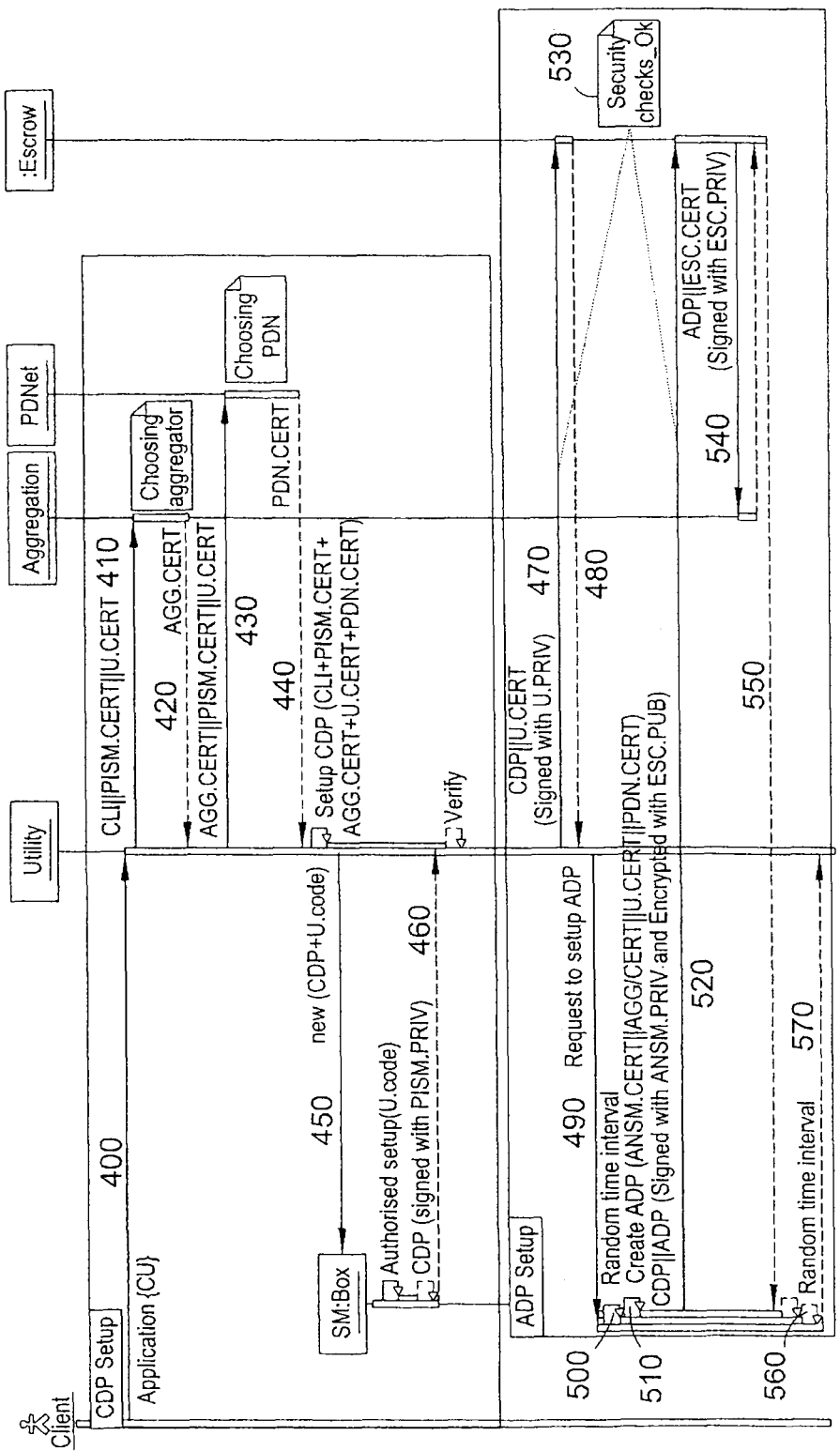
FIG. 4 is a message flow diagram for setting up client and anonymous data profiles of a smart meter.

Although not shown in FIG. 4, all of the above discussed messages can include time stamps and/or a random nonce (number used once) message for added integrity if required.

It will be appreciated that the above discussed method of setting up the client data profile is substantially analogous to the process of setting up a 'normal' smart meter that is not capable of sending consumption data anonymously.

Following the above described setup of the client data profile and the anonymous data profile, the smart meter 160 can start transmitting consumption data to the data collector 170. Two different transmission types are to be distinguished here. The first transmission type relates to the anonymous transmission of consumption data at a high frequency using the anonymous data profile and the HFID. These data transmissions are made as frequently as required by the utility provider 110/data collector 170 for grid management purposes, for example every minute, every five minutes or every fifteen minutes. It will be appreciated that, although the utility provider 110 and data collector 170 cannot identify the smart meter 160 from which the data transmissions originate, these data transmissions are nevertheless based on a data profile that does not change between data transmissions, namely on the anonymous data profile. This enables the utility provider to associate a newly received high frequency anonymous data transmission with a previously received high frequency anonymous data transmission.

The second data transmission type is a lower frequency data transmission that uses LFID and that associates the client data profile with each data transmission. These data transmissions can thus be associated with the smart meter 160 from which the data transmission originates, as is required for billing purposes.

Figure 5:
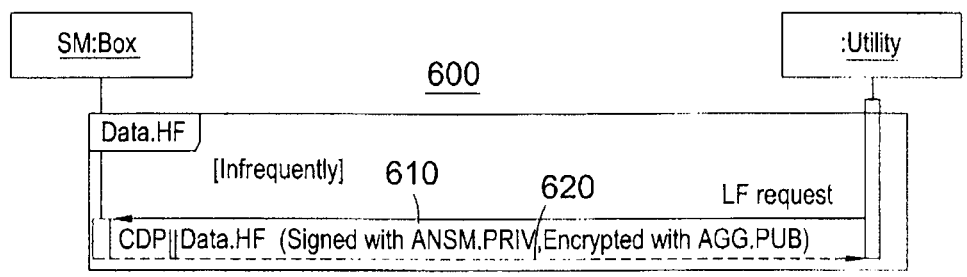
FIG. 5 shows a low frequency metering data exchange between a smart meter and a utility provider.

It is expected that the frequency of data transmission the utility providers will require to receive from smart meters for grid management purposes is likely to change with increasing sophistication of grid management techniques. The frequency of data transmissions for billing purposes can differ between different utility providers. It will be appreciated that the frequency of the high and low frequency data transmissions is therefore not essential, as long as the low frequency data transmissions are conducted at a frequency that prevents the utility provider 110 from associating the high frequency data transmissions with the smart meter issuing the low frequency data transmissions. It is also envisaged that the low frequency data transmissions may be made upon request by the utility provider 110. Such a request-response method 600 is shown in FIG. 5, in which the utility provider 110 sends a request for the transmission of (low frequency) power consumption data to the smart meter 160. The smart meter 160 is of course known to the utility provider 110 through the smart meter's 160 client data profile. The smart meter responds to this request by transmitting the consumption data using its client data profile. As is shown in FIG. 5, the low frequency data request from the utility provider 110 do not in fact have to be received at predetermined points in time. The smart meter 160 may, however, be arranged to impose a minimum time period between consecutive transmissions of the low frequency data to protect the anonymity of the anonymous data profile and of the associated high frequency ID, HFID.

Figure 6:
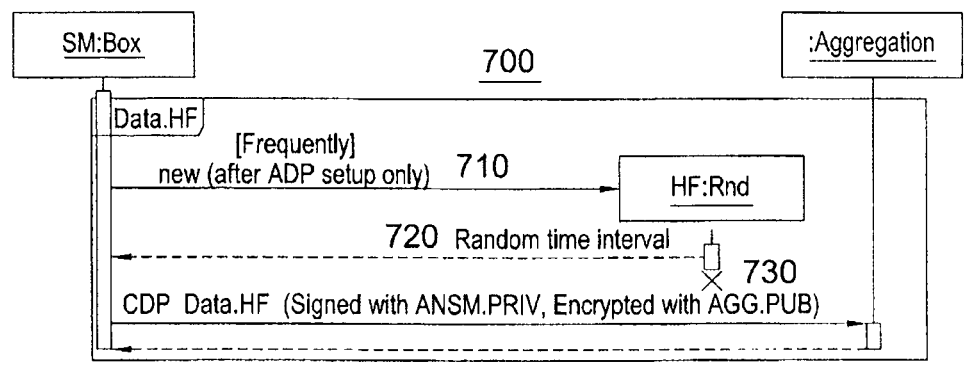
FIG. 6 shows a high frequency metering data exchange between a smart meter and a data collector.

Once the anonymous data profile has been set up and the appropriate random time intervals have passed (as discussed above and as indicated by the time interval between steps 710 and 720 in FIG. 6), the smart meter 160 chooses a random number as an initial meter reading for the high frequency data transmissions and then proceeds to frequently send consumption data to the data collector 170, as shown in step 730 FIG. 6. This choice of a random value as an initial reporting value remove the correlation between low frequency and high frequency meter readings that are sent out from the smart meter 160.

The above discussion focuses on providing high frequency anonymised metering data for the purpose of grid management. The smart meter 160 may further be arranged to provide high frequency metering data upon request using the client data profile, so that the high frequency metering data can be attributed to the smart meter 160 from which it originates. The smart meter 160 may provide the option for such a data transmission to allow the user to participate in marketing research or analysis and meta-data products, for which the smart meter user/customer could be rewarded. The smart meter 160 can, upon receipt of a request for high frequency data to be transmitted in a manner that would allow the utility provider 110 to attribute the data to the smart meter 160, request the user/owner of the smart meter 160 to confirm that an agreed amount of high frequency data is to be transmitted in accordance with the received request. Such high frequency data may be sent to the requesting third party using either the client data profile, as mentioned above, or another attributable transmission profile, such as the users email account. It will be appreciated that the sending of high frequency consumption data in a non-anonymised manner is likely to compromise the anonymity of the thus far anonymous data profile ADF. In order to allow the smart meter 160 to commence sending anonymised consumption data following the sending of attributable high frequency data, it may therefore be necessary to setup a new ADP for a smart meter 160 in question.

The smart meter 160 can also be arranged to reveal its anonymous data profile, including the high frequency ID, HFID, upon receipt of an authorised request from a relevant higher authority, such as a court.

While certain embodiments have been described, these embodiments have been presented by way of example only, and are not intended to limit the scope of the invention. Indeed, the novel methods and apparatus described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A system comprising a data collector and a plurality of end consumers connected to and supplied with a utility by a utility distribution station,
   wherein each end consumer comprises a metering device arranged to meter the end consumer's consumption of the utility supplied by the distribution station, wherein the metering device is arranged to:
   report consumption data to the data collector using a high frequency ID, and
   report the consumption data to the same data collector using a low frequency ID so that the consumption data reported by the metering device together with the low frequency ID is able to be attributed to a particular metering device,
   wherein the metering device is arranged to communicate with the data collector more frequently using the high frequency ID than using the low frequency ID, and
   wherein the data collector stores high frequency and low frequency IDs and is arranged to only accept consumption data carrying a said stored high frequency or a said low frequency ID,
   wherein the high frequency ID is anonymous to the data collector, so that the data collector cannot associate the consumption data reported by the metering device together with the high frequency ID with a particular metering device.

2. The system according to claim 1, wherein the data collector is arranged to store said high and low frequency IDs upon request of a third party, said data collector storing information for identifying messages received from the third party.

3. The system according to claim 1, wherein the data collector checks if the data collector has stored an ID corresponding to the received high frequency ID and, if the data collector has stored an ID corresponding to the received high frequency ID, provides the consumption data to the distribution station.

4. The system according to claim 1, further comprising a trusted third party, and
   the metering device sending a request for configuration of the anonymous metering facility, the request including the high frequency ID of the metering device;
   the third party checking, upon receipt of the request, if a metering device with the ID of the request is entitled to send anonymous metering data and, if the metering device with the ID of the request is entitled to send anonymous metering data, sending a message comprising a permission for the ID to be used in anonymous metering; and
   the data collector checking upon receipt of the message if the third party is entitled to provide a permission for metering devices to use the anonymous metering facility and, if the third party is entitled to provide the permission, storing the ID.

5. A metering device arranged to meter an end consumer's consumption of a utility supplied by a distribution station, wherein the metering device is arranged to:
   report consumption data to a data collector using a high frequency ID, the high frequency ID being anonymous to the data collector so that the consumption data reported by the metering device together with the high frequency ID is not able to be associated to a particular metering device; and
   report the consumption data to the same data collector using a low frequency ID so that the consumption data reported by the metering device together with the low frequency ID is able to be attributed to a particular metering device,
   wherein the consumption data is metering data transmitted via a communication channel using said high frequency ID more regularly than transmitting the metering data using the low frequency ID.

6. The device according to claim 5, further comprising a communication device arranged to participate in a data transmission using the low frequency ID of the metering device and to send a request for a permission for the metering device to participate in anonymous metering using the high frequency ID after the expiry of a waiting period of random length, wherein the request comprises the high frequency ID.

7. The device according to claim 5, wherein the communication device is further arranged to receive a message to commence sending consumption data using the high frequency ID and, after the expiry of a waiting period of random length, start to report consumption.

8. The device according to claim 5, wherein the communication device is further arranged to start sending consumption data using the high frequency ID following receipt of a message to commence sending consumption data using the high frequency ID and, following expiry of a subsequent waiting period of random length, to commence the sending of consumption data.

9. The device according to claim 5, wherein the high and low frequency IDs are two unique IDs.

\* \* \* \* \*